_United States Patent Office_  
3,134,783  
Patented May 26, 1964

3,134,783
P-ALKYL-BENZYL-TROPINIUM HALIDES
Károly Nádor, Budapest, and László Decsi, Pecs, Hungary, assignors to Egyesült Gyogyszer-es Tapszergyar, Budapest, Hungary, a firm
No Drawing. Filed Oct. 26, 1961, Ser. No. 148,310
4 Claims. (Cl. 260—292)

The Hungarian Patent 143,935 describes quaternary tropinium compounds, in which the quaternising group is an arakyl, preferably a p-substituted benzyl group. These compounds are very powerful ganglion-blocking agents, but their parasympatholitic effect is very weak, especially as compared to the corresponding tertiary compounds. The Hunarian Patent 144,335 describes a quaternary tropinium compound, in which the benzyl group in p-position is substituted by a phenyl radical. This type means a progress from the therapeutical point of view, since the ganglion-blocking effect is accompanied by a mild parasympatholitic effect. Besides this advantageous property the characteristic representative of this patent, the 4 - biphenyl - methyl-(+)-tropeyl-tropinium-bromide has the disadvantage that it is hardly soluble in water, consequently solubilising agents have to be used to promote dissolving when preparing solutions for injections. This property is of special disadvantage if the medicament is to be administered per os, for its resorption in the stomach and bowels is not always satisfactory. That accounts for the considerable difference of the effect when administered per os or interperitonially.

When dealing with analogous compounds it has been found that if the benzyl group in para-position is substituted by an alkyl radical—advantageously with one containing 2–8 C-atoms—the so obtained compound is of a much higher therapeutical value. Thus for instance in the case of the p-ethyl-benzyl-atropinium bromide, where the substituent of the benzyl radical is an ethyl group in the p-position, the peroral and intraperitoneal effect is considerably (about three times) higher than that of the analogous p-phenylbenzyl compound. Its solubility and its resorption is much easier too. A further decisive advantage of this substance, as compared to those described in previous patent specifications is its very considerable (about ⅓ of the atropin's) parasympatholytical effect, which accompanies the ganglion blocking effect. This means a further advantage considered from the therapeutical point of view and the toxicity of the compound is about four times lesser than that of the otherwise analogous p-phenyl-benzyl derivatives. This parasympatholytic effect is especially important in derivatives in which the para-positioned substituent of the benzyl group contains 2–4 carbon atoms. If the length of the carbon chain of this p-substituent is increased, the parasympatholytic effect quickly decreases and simultaneously a papaverin-like spasmolytic effect on the unstriped muscles, which gradually increases with the increasing length of the said substituent, is observed. Thus for instance the p-octylbenzyl-atropinium-bromide has about 7 times, the p - n - butyl - benzyl - 3α-(phenyl-cyclohexyl)-acetyl-tropinium-bromide has about 13 times stronger spasmolytic effect on the unstriped muscles than the papaverin. Such effects were never obtained by the compounds described in the above cited patents.

It has been found that if the p-positioned substituent of the benzyl radical contains 2–4 C-atoms, the compounds still show a considerable ganglion blocking effect, but if the length of the carbon chain is increased, this effect rapidly decreases and the papaverin-like spasmolytic effect quickly increases.

The new compounds according to our invention represent considerable technical progress as compared to those known in the art, since
(1) Its ganglion blocking effect is accompanied by a considerable parasympatholytic effect,
(2) Their dissolving and resorption is better,
(3) They have a considerable spasmolytic effect,
(4) Their toxicity properties are more favourable.

The compounds according to the invention are characterized by the following structural formula:

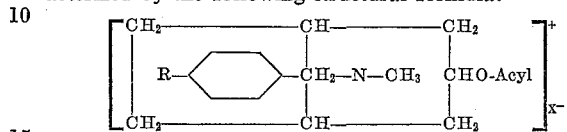

in which

R stands for a straight or a branched carbon chain containing 2–8 carbon atoms,
Acyl stands for an optional carboxylic acid group,
$x$ stands for some anion.

The acyl group, relative to the nitrogen atom, can be in a syn- (α-) or anti-(β-) position. To obtain these compounds, the tropeines (or tropine esters) of the structural formula

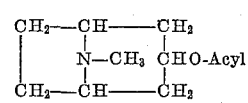

are reacted with a reactive ester of an aryl-alcohol of the general formula

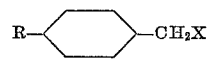

where R stands—according to the above definition—for a straight or branched carbon chain containing 2–8 carbon atoms. It is advisable to choose for quaternisation compounds wherein $x$ stands for a halogen atom or a methane-sulphonyl (mesyl) or a p-toluol-sulphonyl (p-tosyl) group. Another way of procedure is to transform first the tropine (tropane-3α-ol) or the stereoisomer of same, the tropane-3β-ol with the compound

into a quaternary tropinium salt and the acyl-radical is introduced ulteriorly by way of the usual O-acylating processes into the OH-group attached to the 3rd carbon atom.

The so obtained products may be processed—with the usual additional substances—into pharmaceutical products, such as tablets or injections.

The process is demonstrated in the following examples, with the remark, that the scope of the present invention is not limited to these examples only. The procedure can also be carried out under different conditions as to solvents, temperature, the ratio of reacting components, etc.

*Example 1*

7.35 g. (0.03 M) of benzoyl-α-tropine is dissolved in 50 ml. of acetone, 6.2 g. of p-ethylbenzylbromide, dissolved in 25 ml. of acetone are added and the substance is heated under reflux for 2 hours on a water-bath. Right at the beginning of heating the quaternary compound begins to separate. The reaction mixture is cooled, the product filtered, washed with acetone and dried. The so obtained p-ethylbenzyl-3α-benzoyl-tropinium bromide weighs 12.6 g. (yield: 94.7%), it melts at 226° C. under disintegration. Recrystallised from a mixture of ethanol and methanol the melting point is raised to 229–233° C.

Example 2

The p-tert. butyl-benzyl-3α-benzoyl-tropinium bromide is obtained in the same way, with the difference that 7 g. of p-tert. butyl-benzyl-bromide is used as a quaternising agent. Yield: 14 g.=98.5%. The raw product, having an M.P. of 223° C.; if recrystallized from a mixture of isopropyl alcohol and ether, the melting point is raised to 228° C.

Example 3

8.7 g.=0.03 M atropine-base is dissolved in 50 ml. acetone under mild heating, then heated with an acetonic solution of 6 g. p-ethylbenzyl-bromide for 2 hours. In the first minutes of the heating the quaternary salt begins to separate. The raw p-ethylbenzyl-atropinium bromide is obtained with a yield of 96.5%. This raw product is recrystallized from acetonenitryl or a mixture of isopropyl alcohol and ether; M.P. 177° C.

Example 4

The p-isopropyl-benzyl-atropinium-bromide, prepared according to Example 3 and recrystallized from alcohol melts at 205° C.

Example 5

The p-ethylbenzyl-atropinium-bromide, described in Example 3, is obtained almost in a theoretical quantity if dimethylsulfoxide is used as solvent.

Example 6

8.7 g. of atropine base, dissolved in 50 ml. of acetone, is heated for 2 hours with 8.6 g. of p - alkyl - benzyl-bromide, dissolved in 25 ml. acetone. Since a part of the quaternary salt remains in solution, the reaction mixture is dried in vacuo and the residue recrystallized first from acetone ether, then from acetonitryl ether. The p-octylbenzyl-atropinium-bromide so obtained melts at 161° C.

Example 7

10.7 g. phenyl-cyclohexyl-acetyltropine are dissolved in 50 ml. acetone and heated to about 60° C. with 7 g. of p-n-butyl-benzylbromide, dissolved in 25 ml. acetone. The yield is 82% of raw p-n-butyl-benzyl-3α-(phenyl-cyclohexyl)-acetyltropinium-bromide, which, recrystallized from alcohol, melts at 245–252° C. while decomposition.

Example 8

4.34 g. (0.015 M) of 3β - ψ - (±) - tropoyl-tropine (ψ-atropine) (M.P. 91–93° C.) is dissolved in 30 ml. luke-warm acetone and heated on a water-bath for 5 hours with 3 g. of p-ethylbenzyl-bromide dissolved in 10 ml. of acetone. The quaternary compound first separates as an oily substance, but next day crystallizes. It is filtered and washed with acetone. The substance is very hygroscopic, consequently its M.P. cannot be stated in a very definite way: it ranges between 95 and 100° C., under decomposition.

Example 9

4.25 g. of tropane-3α-ol (tropine) is dissolved in 25 ml. of acetone and quaternised with 6 g. of p-ethylbenzyl-bromide as described in the previous examples. The p-ethyl-benzyl-tropinium-bromide is obtained with an almost theoretical yield. Recrystallized from nitromethane it melts—while decomposing—at 219–220° C.

Example 10

6.8 (0.02 M) p-ethylbenzyl-tropinium-bromide is fused for 2 hours at 120° C. with 4.5 g. (0.03 M) benzoyl-chloride. After a hydrochloric acid gas is developed the melt is recrystallized from methanol. The result is the compound described in Example 1 which melts at 230–233° C. while decomposing.

What we claim is:

1. A non-toxic p-alkylbenzyl tropinium compound of the Formula I

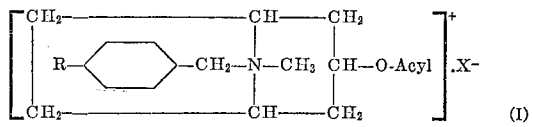

wherein R stands for alkyl containing 2 to 8 carbon atoms, "acyl" stands for a member of the group consisting of tropeyl, benzoyl and acetyl, and X stands for a halogen atom.

2. p-Ethylbenzyl atropinium bromide.
3. p-Isopropylbenzyl atropinium bromide.
4. p-Octyl-benzyl-atropinium-bromide.

References Cited in the file of this patent

UNITED STATES PATENTS

| | | |
|---|---|---|
| 2,833,773 | Nador et al. | May 6, 1958 |
| 2,921,938 | Wetterau | Jan. 19, 1960 |

OTHER REFERENCES

Shea: Chem. Abstracts, vol. 50, col. 13296 (1956).

Nador et al.: Chemical Abstracts, vol. 53, col. 580–81 (1959).